June 10, 1969 CARL-ERIK GRANQVIST 3,449,669

FREQUENCY CONTROL CIRCUIT TRANSFORMING PHASE ANGLE INTO FREQUENCY

Filed Feb. 7, 1966

INVENTOR
CARL-ERIK GRANQVIST

BY Larson and Taylor
ATTORNEYS

INVENTOR
CARL-ERIK GRANQVIST

BY Larson and Taylor
ATTORNEYS

INVENTOR
CARL-ERIK GRANQVIST

BY Larson and Taylor

ATTORNEYS

INVENTOR
CARL-ERIK GRANQVIST
BY Larson and Taylor
ATTORNEYS

INVENTOR
CARL-ERIK GRANQVIST
BY Larson and Taylor
ATTORNEYS

United States Patent Office 3,449,669

Patented June 10, 1969

3,449,669
FREQUENCY CONTROL CIRCUIT TRANSFORMING PHASE ANGLE INTO FREQUENCY

Carl-Erik Granqvist, Lidingo, Sweden, assignor to AGA Aktiebolag, Lidingo, Sweden, a corporation of Sweden Filed Feb. 7, 1966, Ser. No. 525,634
Claims priority, application Sweden, Mar. 6, 1965, 2,864/65
Int. Cl. G01r *23/14;* H03b *19/12*
U.S. Cl. 324—82 9 Claims

ABSTRACT OF THE DISCLOSURE

An oscillator is controlled to make its frequency a linear function of the phase of a signal oscillation relative to a reference oscillation. The output of the oscillator is supplied to a delay network having a constant time delay. An auxiliary oscilllator produces an auxiliary oscillation which is heterodyned with the input and with the output of the delay network to produce first and second heterodyne signals, respectively. A first phase detector compares the first heterodyne signal with the reference oscillation and controls the auxiliary oscillator to maintain frequency and phase equality between them. A second phase detector compares the phase of the second heterodyne signal with that of the signal oscilaltion and controls the oscillator so as to maintain phase equality, which is obtained when the phase difference before and after the delay network equals that between the signal oscillation and the reference oscillation.

The present invention relates to a control circuit for establishing a predetermined relationship between a phase angle and a frequency.

When it is desired to translate an angular measurement in the form of a phase angle by radio waves or via communication networks, it is very difficult to avoid phase distortion en route. A known method of avoiding this difficulty consists in transforming the phase value into a frequency and translating the frequency as a signal over the signal path. The advantage of this method lies in the tendency of most communication networks to conserve frequency better than phase.

In a known circuit for transforming a phase value into frequency, the phase angle is represented by the angular position of and adjustable condenser which determines the frequency of an oscillator, whereby the oscillator frequency is a predetermined function of the phase value. For instance, a linear relationship may be obtained by suitably shaping the condenser plates in a well known manner.

In this type of arrangement, it is extremely difficult to obtain an accurate linearity between the phase value and the frequency. Not only do the condenser plates have to be shaped with the utmost precision, but the oscillator frequency must also be accurately defined in dependence on the condenser adjustment. Since an oscillator contains many components subject to aging, ambient temperature influence and other factors, it is practically impossible to obtain by this method a very high degree of linearity.

An object of the present invention is to establish a predetermined relationship between a phase angle and a frequency with a very high degree of precision.

An additional object of the invention is to provide a control circuit for establishing a predetermined relationship between a phase angle and a frequency which is characterized by a high degree of accuracy, particularly in which said relationship is an accurate linear functional interdependence.

Another object of the invention is to transform a phase value into a frequency value to facilitate indication of the phase value in digital form.

A further object is to provide a control circuit adapted for transforming a phase value obtained as a measure of a distance into an accurately corresponding frequency.

The characteristic features of the control circuit according to the invention are: an oscillator for generating an output signal of controllable frequency, a delay network to which is applied an input signal having a predetermined phase relation to the output of the oscillator, a phase detector to which is applied a first input signal in predetermined phase relation to the said phase angle and a second input signal in predetermined phase relation to the output of the delay network, the output signal of the phase detector controlling the frequency of the oscillator so as to make it an accurately defined function of the phase angle.

An advantageous feature of the invention is the use of a delay network for transforming a frequency variation into a phase variation as well as the control of the oscillator frequency by a phase detector which compares the phase delay produced in the network with the phase angle. This tends to make the arrangement independent of aging phenomena or the like in the oscillator and the accuracy of the arrangement, if a linear interdependence is desired, is determined primarily by the degree of constancy of the network delay and the accuracy with which the frequency of the oscillator output can be measured. Since it is possible to measure frequency with extremely high precision and delay networks can also be made with a high degree of precision, the circuit is well adapted for high precision indication of phase values in digital form.

In a modified form of the invention, there is applied to the delay network a signal of a frequency representating a phase value and the input as well as the output signal of the network is heterodyned with an auxiliary oscillation whose frequency is controlled so as to make the heterodyne signal obtained from the input signal and the auxiliary oscillation be in phase with a locally produced reference oscillation. The second heterodyne signal obtained from the delay network output and the auxiliary oscillation has a phase angle which is proportional to the applied frequency.

Further advantages and features of the invention will become apparent in connection with a description of various embodiments thereof illustrated on the attached drawings.

Throughout the present description the form of a signal will be given as the linear function of time $t$ of which the signal may be considered as being a sine function. An expression such as $\omega_2(t+T)$ is, therefore, merely a shorter form of representing sin $(\omega_2 t+\omega_2 T)$, etc.

*Description of FIG.* 1

Figure 1:
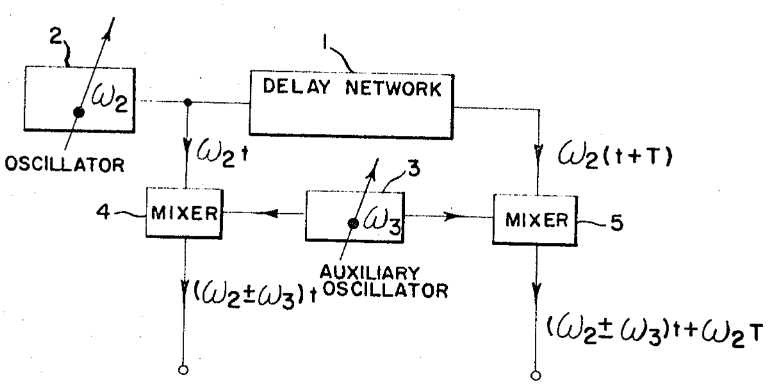
FIG. 1 is a diagram illustrating the principle of the invention.

FIG. 1 illustrates the principle of the invention. To a delay network 1 is applied from an oscillator 2 an oscillation of the form $\omega_2 t$. The time delay of the network is T, so that the output signal is of the form $\omega_2(t+T)$. An auxiliary oscillator 3 applies its output frequency $\omega_3$ to heterodyning means in the form of mixers 4 and 5, to which are also applied $\omega_2 t$ and $\omega_2(t+T)$, respectively, so that the outputs from the mixers 4 and 5 are $(\omega_2 \pm \omega_3)t$ and $(\omega_2 \pm \omega_3)t + \omega_2 T$, respectively. The phase difference between the outputs therefore is $\omega_2$T and it is apparent from FIG. 1 that the circuit is such that there is proportionality between this phase difference and $\omega_2$.

Figure 2:
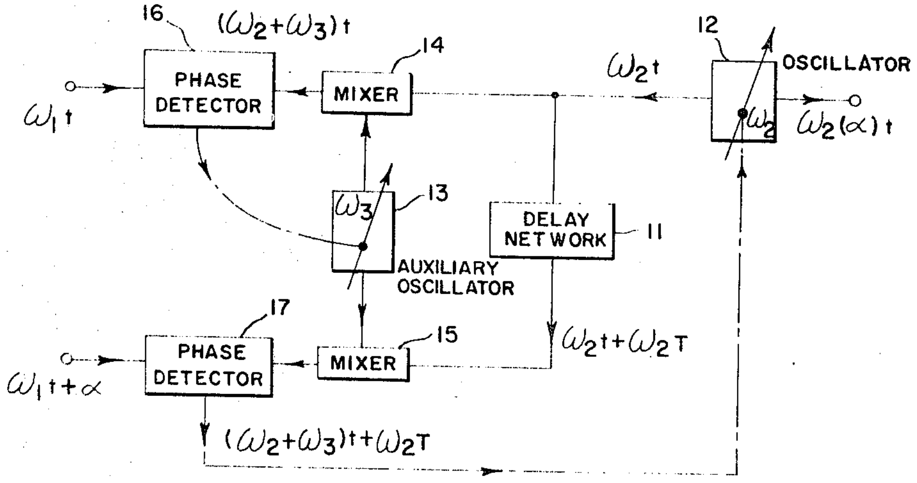
FIG. 2 is an embodiment of the invention.

*Description of FIG. 2*

The FIG. 2 embodiment comprises units corresponding to those of FIG. 1 designated by corresponding reference numbers preceded by the digit 1. The output of the mixer 14 is applied to a means for controlling the phase of the auxiliary oscillator 13 in the form of a phase detector 16, to which there is applied a phase reference oscillation $\omega_1 t$ representing zero phase. To a phase detector 17 is applied the output of mixer 15 as well as an input signal $\omega_1 t + \alpha$ representing the phase angle $\alpha$ relative to $\omega_1 t$. The output from phase detector 17 controls the frequency $\omega_2$ of oscillator 12.

*Operation of FIG. 2 embodiment*

The detector 16 produces a phase control signal which controls the frequency $\omega_3$ of the oscillator 13, whereby $\omega_3$ is made to track $\omega_2$, so that always $$\omega_1 = \omega_2 + \omega_3 \quad (1)$$

The output $(\omega_2 + \omega_3)t + \omega_2 T$ is compared in phase in the phase detector 17 with $\omega_1 t + \alpha$ and the detector output signal controls the frequency $\omega_2$ in such a way as to establish phase equality according to the equation:

$$\omega_1 t + \alpha = (\omega_2 + \omega_3)t + \omega_2 T \quad (2)$$

It follows in view of Equation 1 that $\alpha = \omega_2 T$. The output of the oscillator 12 is therefore of a frequency $\omega_2(\alpha)$ which is proportional to the phase angle $\alpha$.

It is to be noted that $\alpha$, throughout the present specification, may mean $\alpha + 2kT$, $k$ being an integer.

In the FIG. 2 embodiment, $\omega_2(\alpha)$ is identical with $\alpha$/T, i.e. a linear function. The circuit can be modified to produce a frequency $\omega_2$ which is another function of $\alpha$, such as $$\omega_2 = f(\alpha) \quad (3)$$

This can be achieved with the aid of the inverse function of $f$, which may be designated $f^{-1}$, so as to make $$\alpha = f^{-1}(\omega_2) \quad (4)$$

and constructing the delay network 11 to have a phase shift of the value $f^{-1}(\omega_2)$.

Figure 3:
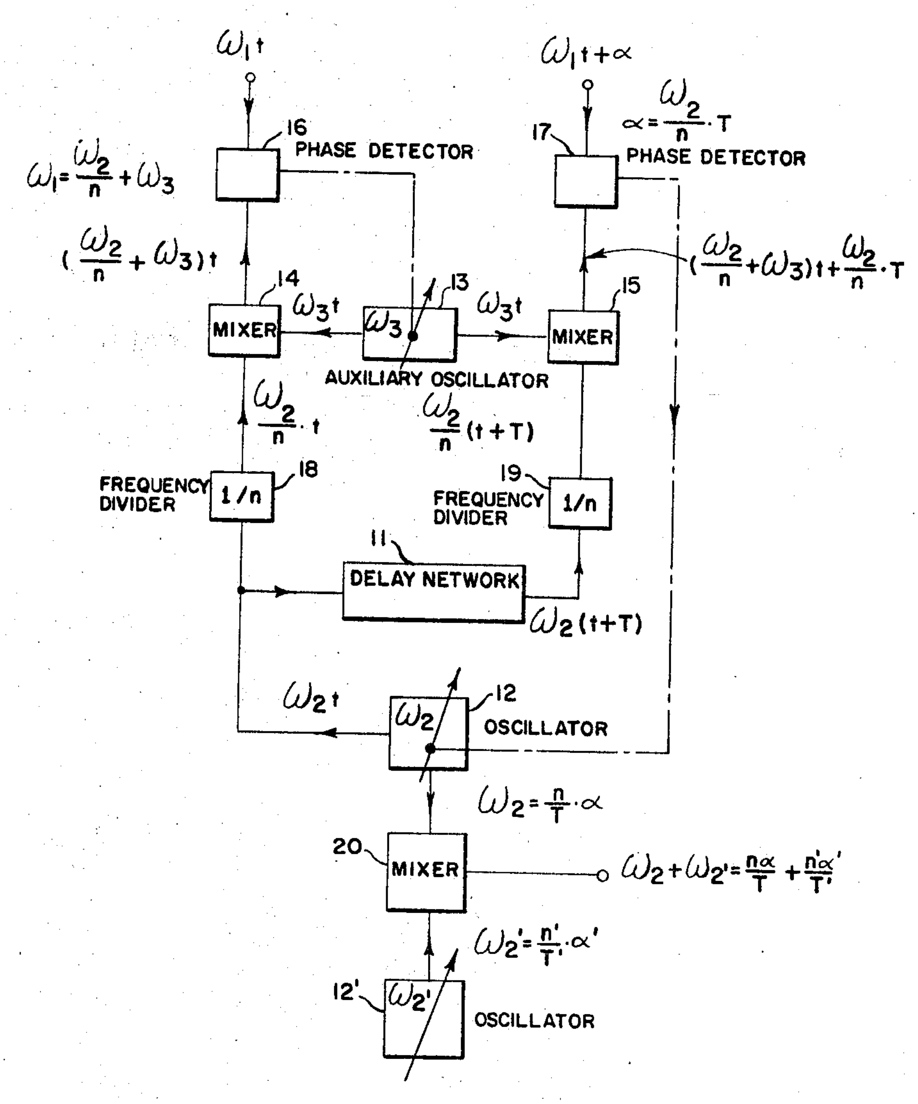
FIGS. 3 and 4 show further embodiments of the invention shown in FIG. 2.

*Description of FIG. 3*

FIG. 3 shows a modified form of the circuit of FIG. 2. Units 11 . . . 17 correspond to FIG. 2. The modification consists in that a pair of frequency dividers 18 and 19 dividing the frequency applied thereto by a factor of $n$ are inserted before mixers 14 and 15, respectively. This portion of the circuit generates a frequency $\omega_2$ of the form $n\alpha/T$. An additional oscillator 12' is provided for generating a similar frequency $\omega_2'$ having a value of $n'\alpha'/T'$. In a mixer 20, $\omega_2$ is added to $\omega_2''$.

38 HICKS — 43141 — May 23rd (Day Patents) 38

*Operation of FIG. 3 circuit*

The operation is similar to what was described in connection with FIG. 2. Owing to the presence of the frequency dividers 18 and 19, however, instead of $\omega_2$ there appears on the output side of the frequency dividers the divided frequency $\omega_2/n$. Otherwise, the operation of units 13 . . . 17 is as described in connection with FIG. 2. The delay network 11 has applied to it the undivided frequency $\omega_2$, and produces a phase shift of $\omega_2$T. Owing to the presence of the frequency dividers, there appears instead a corresponding phase shift of $\omega_2 T/n$ in the heterodyne signal from mixer 15, which is compared in phase detector 17 with the phase angle $\alpha$ of the input signal $\omega_1 t + \alpha$. This causes $\omega_2$ to have the form $n\alpha/T$ and the circuit thus produces a phase-dependent frequency $\omega_2$ which is multiplied by a factor of $n$.

The additional oscillator 12', in an analogous manner, produces an output frequency $\omega_2' = n'\alpha'/T'$ and the addition of these frequencies in mixer 20 yields the following result:

$$\omega_2 + \omega_2' = n\alpha/T + n'\alpha'/T' \quad (6)$$

Figure 5:
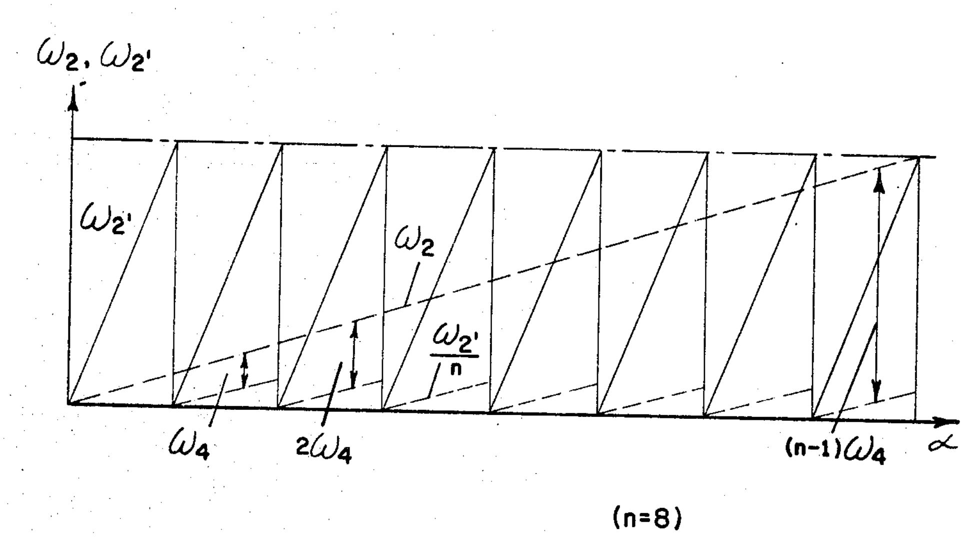
FIG. 5 is a graph to explain the operation of the FIG. 4 embodiment.

*Description of FIG. 5*

It may not be practical to use the original angle $\alpha$ itself for deriving a representative frequency $\omega_2$ of a high degree of precision, particularly when the angle $\alpha$ is obtained from mechanical devices, such as gyro rotors or the like. For instance, the phase angle representing the angular position of a rotar may be obtained with the aid of a toothed wheel and if the number of teeth is chosen to be high, a corresponding increase in precision is obtained, on the other hand this multiplies the rotation of the wheel by a factor $n$, and one revolution or one complete period of $\alpha$ (from 0 to $\pi$) corresponds to a variation of $n\alpha$ from 0 to $2\pi$. To make possible the high degree of precision without losing the value of $\alpha$ itself, it is preferable to retain $\alpha$ also and generate two input signals of the form $\omega_1 t + \alpha$ and $\omega_1 t + n\alpha$, the first one of which is used to "tell" the control circuit when $n\alpha$ has completed a full period. It may also be practical to use a pair of multiplied phase values $m\alpha$ and $n\alpha$.

The FIG. 5 control circuit is of the type where the angle $\alpha$ is obtained from an angle generator 59 as the phase difference between a pair of signals $\omega_1 t$ and $\omega_1 t + \alpha$, as described in connection with FIG. 2. Coupled to generator 59 via a step-up device 58 is an angle generator 59' providing signals $\omega_1 t$ and $\omega_1 t + n\alpha$.

The circuit comprises a first subcircuit composed of units 11 . . . 17 as described in connection with FIG. 2 and a second subcircuit of the same type comprising units 51 . . . 57, to which are applied signals $\omega_1 t$ and $\omega_1 t + n\alpha$ from angle generator 59'.

The output $\omega_2$ of the first subcircuit is fed to a phase comparator 62 and the output $\omega_2'$ of the second subcircuit to a frequency divider 60 of ratio $1/n$. The output $\omega_2'/n$ of divider 60 is heterodyned in a mixer 61 with a frequency-reference oscillation $k\omega_4$ to reconstitute in the output circuit of the mixer the frequency $\omega_2$, which is also applied to phase comparator 62.

The output of phase comparator 62 is a switching signal which is fed to a counting circuit 65, the output of which is applied to a switching circuit 64, to which are also applied multiples $k\omega_4 (k=1,2,3 \ldots)$ of a reference frequency $\omega_4$ generated in a reference oscillator 63.

Figure 4:
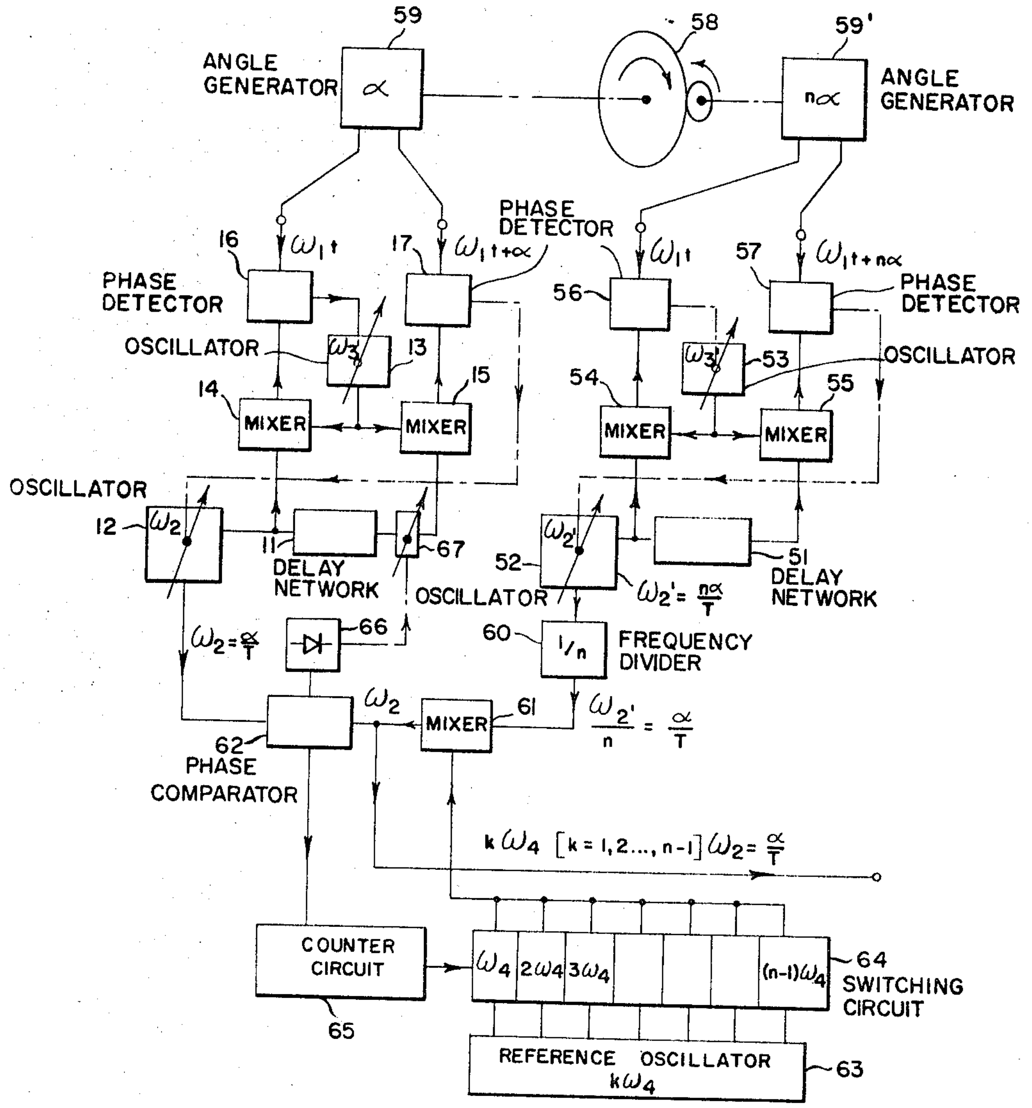

*Operation of FIG. 4 circuit*

The first and second subcircuits operate to generate output signals of frequencies $\omega_2 = \alpha$/T and $\omega_2' = n\alpha/T$, respectively. It is to be noted that $\omega_2'$ represents the angle $\alpha$ with a high degree of precision, since the angle generator 59' as it were "spreads" the original angle $\alpha$ over a much larger portion of the circumference. However, the result of this is that $\omega_2'$ makes $n$ complete periods when $\omega_2$ makes complete period of $2\pi$. Frequency divider 60 divides $\omega_2'$ down to $\omega_2'/n$.

Reference is made to FIG. 5 which illustrates the way in which $\omega_2$ and $\omega_2'$ vary as functions of $\alpha$. For the purposes of illustration, $n$ was taken to have the value 8 in this figure $\omega_2'$ is seen to vary at a much faster rate than $\omega_2$. The division by $n$ makes $\omega_2'/n$ vary at the same rate as $\omega_2$ but it still makes 8 complete periods when $\omega_2$ makes one.

To extend the operating range of the circuit, reference oscillator 63 is provided to generate multiples of the frequency $\omega_4$ which is required to be added in a stepwise manner for each completed period of $\omega_2'/n$. This takes place in mixer 61 and the value $k\omega_4$ of the added multiple has to change each time when $\omega_2'/n$ has made one revolution of $2\pi$. It is to be noted that a reference oscillator can easily be designed to have an extremely high degree of precision, so that the addition of multiples $k\omega_4$ in mixer 61 does not detract from the precision inherent in the measurement of $\omega_2'$.

Phase comparator 62 responds to the output signals of oscillator 12 and mixer 61 and applies a switching signal to counting circuit 65 for each completed revolution of $\omega_2'/n$. Counting circuit 65 applies a multiple-representative signal indicative of the value of $k$ to switching circuit 64 and causes it to select the next multiple of $\omega_4$, so that there is added in mixer 61 to $\omega_2'/n$ a frequency $\omega_4$ in the second period shown in FIG. 6, $2\omega_4$ in the third period and so on.

It is preferable to provide an adjustment of the delay of network 11 by means of an adjustable delay corrector 67 to which there is applied a delay control signal obtained from phase comparator 62 via a rectifying circuit 66. This makes the output $\omega_2$ of oscillator 12 track the variation of $\omega_2$ obtained from mixer 61 and shortens the "uncertainty" interval when counting circuit 65 switches to the next multiple.

Figure 6:
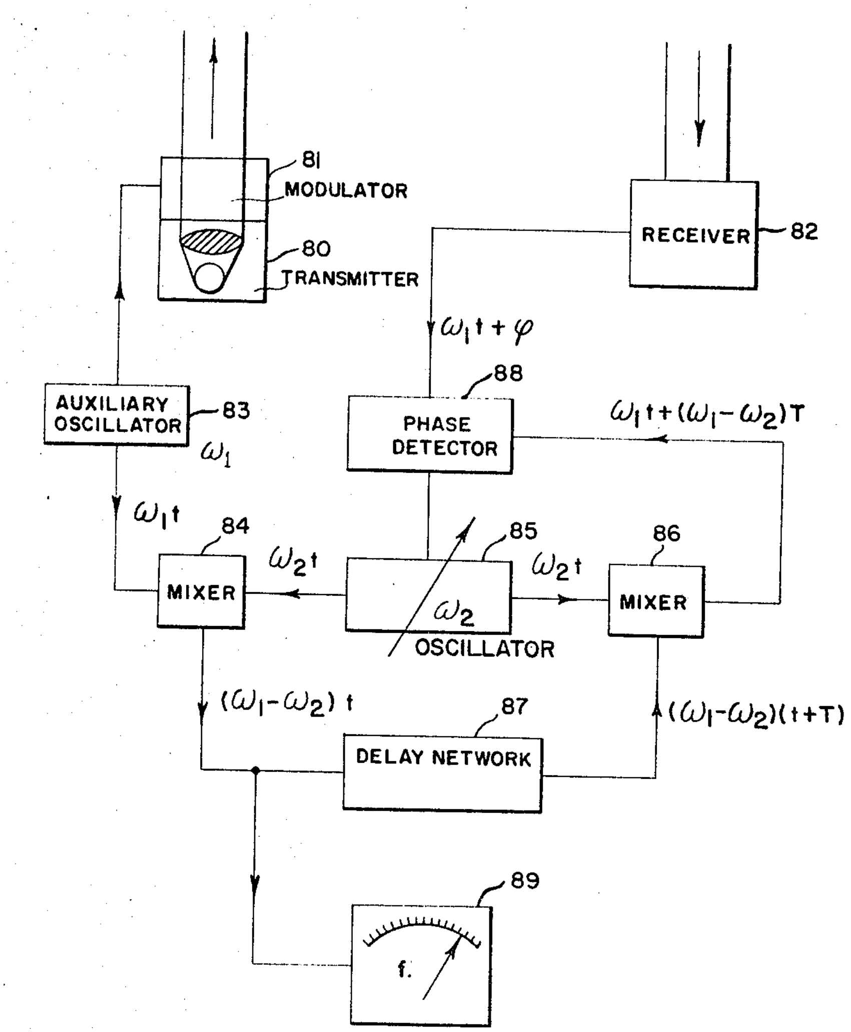
FIG. 6 shows the control circuit of the invention in a distance-measuring instrument of the phase-comparing type.

*Description of FIG. 6*

FIG. 6 shows the application of the control circuit of the invention to a distance-measuring instrument of the type emitting a modulated beam of light and receiving it after reflection thereof at a distant object.

The instrument comprises a transmitter 80 for emitting a beam of light which is passed through a modulator 81. After reflection at a distant object, the modulator beam is picked up by a receiver 82.

The emitted beam is modulated with an auxiliary oscillation $\omega_1 t$ obtained from an auxiliary oscillator 83 and the returned beam has a corresponding modulation $\omega_1 t+\varphi$, where $\varphi$ is the phase delay over twice the measured distance.

As in previous embodiments, there are provided an oscillator 85 of controllable frequency, a delay network 87, and a phase detector 88. The output signal of the oscillator is applied to a first mixer 84, in which it is heterodyned with the output of auxiliary oscillator 83 to form a heterodyne signal of a second frequency $\omega_1-\omega_2$, which is applied as an input signal to delay network 87 and has a predetermined phase relation to the output of oscillator 85.

The output of the delay network is of the form $(\omega_1-\omega_2)\ (t+T)$ and is applied to a second mixer 86 together with the output of oscillator 85 to form a second input signal $\omega_1 t+(\omega_1-\omega_2)T$ which is applied to the phase detector 88 and forms a second input signal having a predetermined phase relation to the output of the delay network.

A high-precision frequency-measuring instrument 89 has applied to it the input signal of the delay network 87, the frequency of which is directly proportional to $\varphi$ and to the measured distance.

It should be noted that the oscillator 83 is inherently of a very high degree of precision, on which the accuracy of this type of distance measuring instrument is based, so that the application of the present invention to this type of instrument does not place additional requirements on the accuracy of its components.

The operation of the FIG. 6 circuit is believed to be clear in view of the explanations of the foregoing embodiments of the invention.

What is claimed is:

1. An electrical circuit comprising a control circuit for generating a frequency as a linear function of the phase angle of a signal oscillation comprising:

a first oscillator having a frequency-control input, a delay network having a constant delay time within a given range of frequencies and having an input and an output, means connected to said delay network input for supplying thereto the output of said first oscillator, an auxiliary oscillator having a phase control input and generating an auxiliary oscillation, first heterodyning means having a first input connected to the output of said auxiliary oscillator and a second input connected to the output of said first oscillator for heterodyning said auxiliary oscillation with said first oscillator output signal to create a first heterodyne signal having a second frequency and having a predetermined phase relationship to said first oscillator output signal, second heterodyning means having a first input connected to the output of said auxiliary oscillator and a second input connected to the output of said delay network for heterodyning said auxiliary oscillation with the output signal of said delay network to form a second heterodyne signal of said second frequency having said predetermined phase relationship to said delay network output signal, first phase detector means having an output connected to the phase-control input of said auxiliary oscillator and having a first input connected to the output of said first heterodyning means and a second input, means for supplying a phase reference oscillation to said second input, second phase detector means having first and second inputs and an output, means for supplying said signal oscillation to said first input of said second phase detector means, and means connecting said second input of said second phase detector means to said second heterodyne signal, the output of said second phase detector means being connected to said oscillator frequency-control input, whereby the frequency of said oscillator is controlled so as to be a linear function of the phase angle of said signal oscillation relative to said phase reference oscillation.

2. An electrical circuit as claimed in claim 1, wherein said control circuit further comprises a pair of frequency dividers connected to the first inputs of said first and second heterodyning means respectively to divide the input signals thereto by the same factor.

3. An electrical circuit as claimed in claim 2, further comprising a second said control circuit, the frequency dividers of said second control circuit having a dividing factor differing from that of said first-mentioned control circuit, and additional heterodyning means connected to the outputs of said oscillators for generating an output signal whose frequency is the sum of the frequencies of the outputs of said first-mentioned and said second control circuits.

4. An electrical circuit as claimed in claim 1 further comprising a second said control circuit, means for applying a first signal oscillation representing a multiple of said phase angle to the first input of the second phase detector means of said first-mentioned control circuit, means for applying a second signal oscillation representing a different multiple of said phase angle to the first input of the second phase detector means of said second control circuit, means connected to the outputs of the oscillators of said control circuits for frequency-dividing said outputs to generate secondary outputs of the same frequency, a third heterodyning means having first and second inputs, means for applying one of said secondary outputs to the first input of said third heterodyning means, a frequency-reference oscillator generating a constant-frequency reference oscillation and comprising switching and frequency-multiplying means connected between said frequency-reference oscillator and said third heterodyning means and responsive to predetermined values of said phase angle for applying corresponding multiples of said frequency-reference oscillation to the second input of said third heterodyning means.

5. A control circuit as claimed in claim 4 further comprising a phase comparator responsive to said phase-angle proportional output signal and to the other of said secondary output signals to generate a switching signal when said phase angle reaches one of said predetermined values, a counting circuit connected to said phase comparator and responsive to said phase comparator switching signal to generate a multiple-representative signal, and means for applying said multiple-representative signal to said switching and frequency-multiplying means to generate a corresponding frequency multiple.

6. A control circuit as claimed in claim 5 further comprising means connected to said phase comparator and responsive thereto for generating a delay control signal and means for adjusting the delay of one of said control circuits in response to said delay control signal.

7. A distance measuring arrangement comprising:

a transmitter for emitting a beam of light, a modulator for modulating said beam, an auxiliary oscillator for supplying to said modulator a fixed-frequency modulation signal, a receiver for receiving said beam after reflection thereof at a distant object and deriving a delayed modulation signal at a phase angle representing the distance of the object, a variable frequency oscillator having a control input, first heterodyning means having one input connected to said auxiliary oscillator and another input connected to said variable-frequency oscillator and generating a heterodyne signal in the output circuit thereof, a delay network having a constant time delay and having the input thereof connected to the output of said first heterodyning means, second heterodyning means having one input connected to said variable-frequency oscillator and another input connected to the output of said delay network and a phase detector having one input connected to said receiver, another input connected to said second heterodyning means and an output connected to the control input of said variable frequency oscillator.

8. A distance measuring arrangement as claimed in claim 7 further comprising a frequency-measuring instrument and means for applying to said frequency-measuring instrument a signal related to the output signal of said variable frequency oscillator.

9. A control circuit as claimed in claim 8 further comprising means for applying to said frequency-measuring instrument the input signal of said delay network.

References Cited

UNITED STATES PATENTS

| | | | |
|---|---|---|---|
| 3,005,960 | 10/1961 | Levenson | 328—15 X |
| 3,160,803 | 12/1964 | White | 324—82 X |
| 3,177,442 | 4/1965 | Halverson. | |
| 3,199,037 | 8/1965 | Graves. | |
| 3,229,203 | 1/1966 | Minohara. | |
| 3,263,066 | 7/1966 | Seegmiller. | |
| 3,267,357 | 8/1966 | Ravenhill et al. | |
| 3,325,750 | 6/1967 | O'Hern et al. | |
| 3,329,900 | 7/1967 | Graves | 325—346 |
| 3,334,305 | 8/1967 | Yen | 328—15 XR |

OTHER REFERENCES

Electronic Industries, February 1964, p. 75.

RUDOLPH V. ROLINEC, *Primary Examiner.*

P. F. WILLE, *Assistant Examiner.*

U.S. Cl. X.R.

328—15; 356—5